(12) United States Patent
Gonzalez et al.

(10) Patent No.: US 10,936,903 B2
(45) Date of Patent: Mar. 2, 2021

(54) TECHNOLOGIES FOR LABELING AND VALIDATING HUMAN-MACHINE INTERFACE HIGH DEFINITION-MAP DATA

(71) Applicant: Intel Corporation, Santa Clara, CA (US)

(72) Inventors: Domingo Gonzalez, San Jose, CA (US); Ignacio J. Alvarez, Portland, OR (US); Mehrnaz Khodam Hazrati, San Jose, CA (US); Christopher Lopez-Araiza, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 35 days.

(21) Appl. No.: 16/370,988

(22) Filed: Mar. 30, 2019

(65) Prior Publication Data

US 2019/0228262 A1    Jul. 25, 2019

(51) Int. Cl.
| | |
|---|---|
| *G06K 9/62* | (2006.01) |
| *G06K 9/00* | (2006.01) |
| *A63F 13/46* | (2014.01) |
| *A63F 13/23* | (2014.01) |
| *A63F 13/533* | (2014.01) |
| *G06F 3/0488* | (2013.01) |

(52) U.S. Cl.
CPC ............ *G06K 9/6254* (2013.01); *A63F 13/23* (2014.09); *A63F 13/46* (2014.09); *A63F 13/533* (2014.09); *G06K 9/00791* (2013.01); *A63F 2300/1025* (2013.01); *A63F 2300/308* (2013.01); *G06F 3/04883* (2013.01)

(58) Field of Classification Search
CPC ... A63F 13/216; A63F 13/65; G06K 9/00791; G06K 9/6254
See application file for complete search history.

(56) References Cited

U.S. PATENT DOCUMENTS

| | | | |
|---|---|---|---|
| 2012/0114178 A1* | 5/2012 | Platonov | G06K 9/00791 382/103 |
| 2017/0304732 A1* | 10/2017 | Velic | A63H 33/08 |
| 2018/0012082 A1* | 1/2018 | Satazoda | G06K 9/00805 |
| 2018/0136000 A1* | 5/2018 | Rasmusson, Jr. | G05D 1/0246 |
| 2018/0188037 A1* | 7/2018 | Wheeler | G01C 21/3635 |
| 2019/0120947 A1* | 4/2019 | Wheeler | G01S 17/42 |
| 2019/0122073 A1* | 4/2019 | Ozdemir | A61B 6/5217 |
| 2019/0147331 A1* | 5/2019 | Arditi | G01C 21/32 706/20 |
| 2020/0034634 A1* | 1/2020 | Warshauer-Baker | B60W 10/08 |

* cited by examiner

*Primary Examiner* — David Bilodeau
(74) *Attorney, Agent, or Firm* — Alliance IP, LLC

(57) ABSTRACT

Techniques are disclosed herein for collecting annotation data via a gamified user interface in a vehicle control system. According to an embodiment disclosed herein, the vehicle control system detects a trigger to initiate an annotation prompt associated with an object classified from an image. The vehicle control system presents, via a user interface, the annotation prompt. The vehicle control system receives, via the user interface, user input indicative of a response to the annotation prompt by a user and updates a confidence score associated with the classified object as a function of one or more metrics associated with the user.

23 Claims, 8 Drawing Sheets

TECHNOLOGIES FOR LABELING AND VALIDATING HUMAN-MACHINE INTERFACE HIGH DEFINITION-MAP DATA

BACKGROUND

An autonomous vehicle is a vehicle that is capable of sensing a surrounding environment and navigating through the environment to reach a predetermined destination, typically without further input from a vehicle operator. To do so, the autonomous vehicle may include various sensors, such as lasers, radar, global positioning system (GPS), and computer vision technologies. A vehicle control system configured with the autonomous vehicle may process sensor data to identify appropriate navigation paths, obstacles, and relevant signage.

The vehicle control system may incorporate the identified navigation paths, obstacles, and signage into a high definition (HD)-map. HD-maps are highly precise maps (e.g., accurate to the centimeter-level) used by autonomous vehicles to support navigation of the vehicle. HD maps differ from typical navigation maps designed for vehicle operator viewing. For example, HD maps are more precise, have multiple layers of information, and may not be configured for visual display.

In processing the sensor data to identify relevant objects (e.g., obstacles, paths, and signage) for a HD-map, the vehicle control system may use machine learning techniques. For example, the vehicle control system may train an image classifier to recognize such objects. Generally, image classification includes an annotation step used to label data. Further, machine learning-based approaches often require large datasets, and thus, annotation can be time consuming. Traditional approaches for annotation use crowdsourcing tools to expedite ground-truth annotations. However, such approaches are potentially unreliable and require cross-validation.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
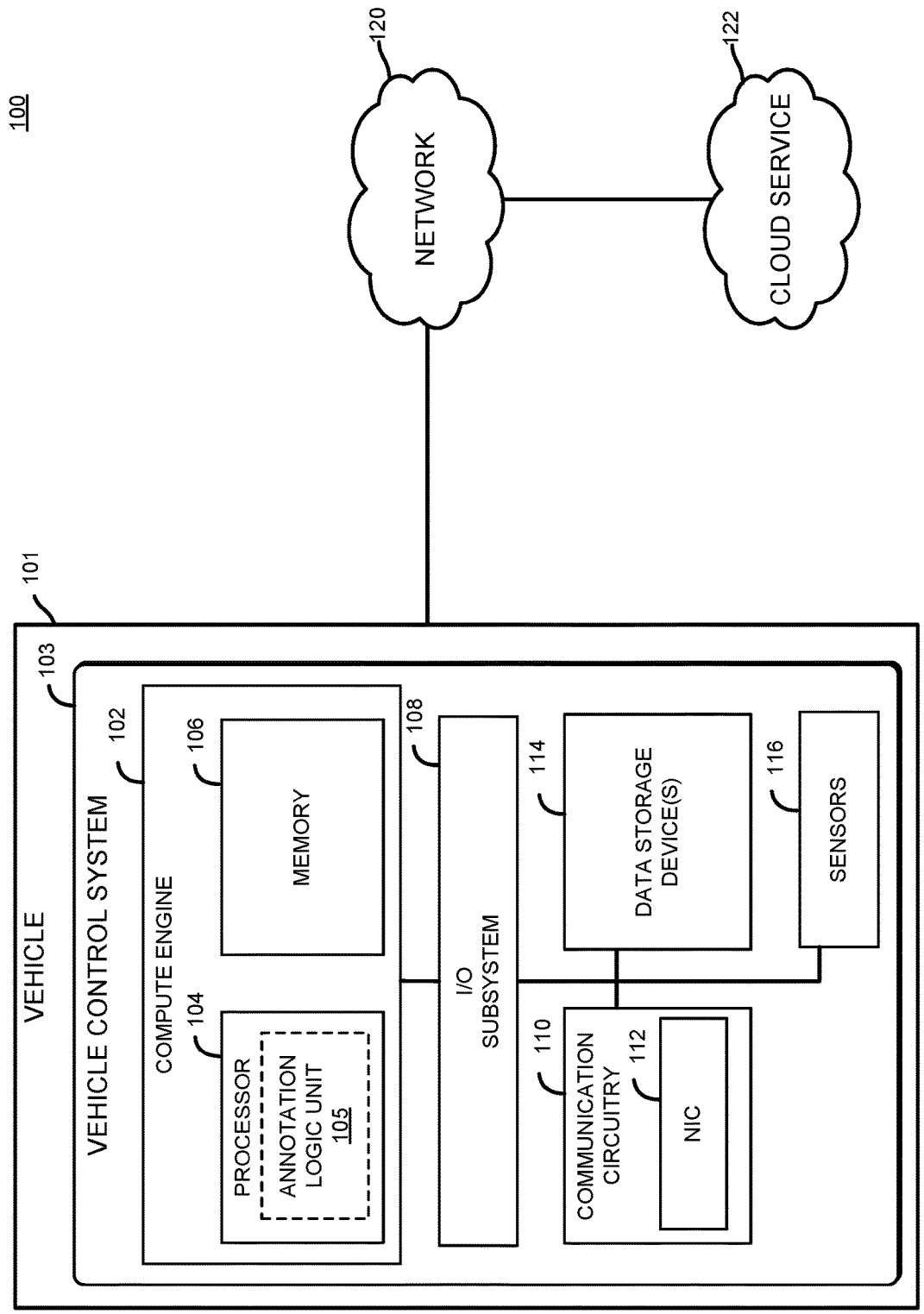
FIG. 1 is a simplified block diagram of at least one embodiment of a computing environment including an autonomous vehicle having a vehicle control system configured with an application to collect annotation data via a gamified user interface.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing environment 100 in which a vehicle 101 collects annotation data via a gamified user interface is shown. In the illustrative embodiment, the vehicle 101 may be any type of autonomous or "driver-less" vehicle capable of transporting passengers. Further, in content with the embodiments described herein, the vehicle 101 needs not be fully autonomous, as one of skill in the art will recognize that the techniques of the present disclosure may also be adapted to partially autonomous vehicles.

As shown, the vehicle 101 includes a vehicle control system 103. The vehicle control system 103 provides decision-making and control logic to cause the vehicle to operate in an autonomous manner with little to no input from a human operator. For example, a given vehicle control system 103 may obtain data from a variety of sensors within a vehicle 101 to determine a visible road geometry, objects (e.g., road signage, traffic posts, pedestrians, other vehicles, etc.) in view of one or more of the sensors, distance from such objects, and so on. Based, in part, on the obtained sensor data, the vehicle control system 103 may determine actions to perform in operation, such as whether to maintain, increase, or reduce speed, change lanes, stop the vehicle, and so on.

The sensor data may be used by the vehicle control system 103 in computer vision-based algorithms used in object detection, scene understanding, and behavioral planning. Such algorithms often apply image classification techniques which classify image data. The image data may be labeled using a technique called annotation, in which a classified object is labeled to provide semantics for the object. Annotated images are collected to provide ground-truth information for supervised training of machine learning models. However, annotation often involves a large amount of manual input which can be time-consuming and sometimes unreliable due to human error.

Embodiments presented herein disclose techniques for collecting annotations for objects via a gamified interactive experience that allows users to provide feedback on environmental objects perceived with on-board sensors (e.g., sensors 116) of the vehicle control system 103. More particularly, as further described herein, the vehicle control system 103 (e.g., via an infotainment display on the vehicle) may expose a gamified user interface (UI) that provides annotation prompts for a user to answer. Responses by the user may then be interpreted as ground-truth annotations based on a user confidence level. The ground-truth annotations can be used by an intelligent layer within a High Definition (HD)-map to provide updates on dynamic objects (e.g., on the road) or road events that might affect vehicle operation. Further, the gamified UI may provide daily challenges and rewards (e.g., rankings, points that may be exchanged for goods and services, etc.) for a user, whose continued input allows the vehicle control system 103 to collect updated data from roads or infrastructure. Further still, information collected by the gamified UI may be broadcasted passively over a network 120 (such as the Internet), e.g., to a cloud service 122 to provide further analytics or model reinforcement for the vehicle 101, to other vehicles in operation, etc. Such information may be used in other vehicles 101 to enhance a HD-map configured thereon by adding any missing information, updating a confidence measure for a given object, or assisting in optimizing trajectories driven by the other vehicles 101.

The illustrative vehicle control system 103 may be embodied as any type of device performing the functions described herein, such as detecting a trigger to initiate an annotation prompt associated with a classified image object, exposing a gamified user interface (UI) on a display, receiving user input indicative of a response to the annotation prompt by a user, and updating a confidence score associated with the classified object as a function of one or more metrics associated with the user.

As shown, the illustrative vehicle control system 103 includes a compute engine 102, an input/output (I/O) subsystem 108, communication circuitry 110, data storage devices 114, and one or more sensors 416. Of course, in other embodiments, the vehicle control system 103 may include other or additional components, such as those commonly found in a computer (e.g., display, peripheral devices, etc.). Additionally, in some embodiments, one or more of the illustrative components may be incorporated in, or otherwise form a portion of, another component.

The compute engine 102 may be embodied as any type of device or collection of devices capable of performing various compute functions described below. In some embodiments, the compute engine 102 may be embodied as a single device such as an integrated circuit, an embedded system, a field programmable gate array (FPGA), a system-on-a-chip (SOC), or other integrated system or device. Additionally, in some embodiments, the compute engine 102 includes or is embodied as a processor 104 and a memory 106. The processor 104 may be embodied as one or more processors, each processor being a type capable of performing the functions described herein. For example, the processor 104 may be embodied as a single or multi-core processor(s), a microcontroller, or other processor or processing/controlling circuit. In some embodiments, the processor 104 may be embodied as, include, or be coupled to an FPGA, an ASIC, reconfigurable hardware or hardware circuitry, or other specialized hardware to facilitate performance of the functions described herein. As shown, the processor 104 may include an annotation logic unit 105, which may be embodied as any device or circuitry to collect user input via the gamified UI, map the user input to a given annotation label, and input the annotation label to a machine learning model.

The memory 106 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 106 may be integrated into the processor 104.

The compute engine 102 is communicatively coupled with other components of the vehicle control system 103 via the I/O subsystem 108, which may be embodied as circuitry and/or components to facilitate input/output operations with the compute engine 102 (e.g., with the processor 104 and/or the memory 106) and other components of the vehicle control system 103. For example, the I/O subsystem 108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 108 may form a portion of a system-on-a-chip (SoC) and be incorporated, along with one or more of the processor 104, the memory 106, and other components of the vehicle control system 103, into the compute engine 102.

The communication circuitry 110 may be embodied as any communication circuit, device, or collection thereof, capable of enabling communications over a network between the vehicle control system 103 and other devices (e.g., the vehicle control system 103 of vehicle 101). The communication circuitry 110 may be configured to use any one or more communication technology (e.g., wired, wireless, and/or cellular communications) and associated protocols (e.g., Ethernet, Bluetooth®, Wi-Fi®, WiMAX, 5G-based protocols, etc.) to effect such communication.

The illustrative communication circuitry 110 includes a network interface controller NIC 112, which may also be referred to as a host fabric interface (HFI). The NIC 112 may be embodied as one or more add-in-boards, daughtercards, controller chips, chipsets, or other devices that may be used by the vehicle control system 103 for network communications with remote devices. For example, the NIC 112 may be embodied as an expansion card coupled to the I/O subsystem 108 over an expansion bus such as PCI Express.

The one or more illustrative data storage devices 114 may be embodied as any type of devices configured for short-term or long-term storage of data such as, for example, memory devices and circuits, memory cards, hard disk drives (HDDs), solid-state drives (SSDs), or other data storage devices. Each data storage device 114 may include a system partition that stores data and firmware code for the data storage device 114. Each data storage device 114 may also include an operating system partition that stores data files and executables for an operating system.

The one or more illustrative sensors 116 may be embodied as any type of devices configured to provide data regarding the surroundings and interior of the vehicle 101 so that control logic in the vehicle control system 103 may carry out actions responsive to the data (e.g., whether to accelerate the vehicle 101 or come to a stop). For example, the sensors 116 can include a global positioning system (GPS), cameras, radar, lasers, speedometers, angular rate sensors, computer vision sensors, and so on. The sensors 116 may communicate data to the control logic (or any other component within the vehicle control system 103, such as machine learning modules thereon) via the I/O subsystem 508.

Further, in an embodiment, the vehicle control system 103 may communicate, via a network 110 (e.g., the Internet), with a cloud service 112, e.g., that executes on a cloud network. The cloud service 122 may transmit relatively up-to-date navigation information (e.g., road conditions, traffic and congestion data, road signage, public safety warnings, navigation information sent by other vehicles, and the like) to the vehicle control system 103. The vehicle control system 103 may apply the navigation information to various components therein. For example, the vehicle control system 103 may determine, based on navigation information received from the cloud service 122, that traffic towards a specified destination is relatively congested on a given path, and control logic in the vehicle control system 103 may determine a less congested path to the destination. As another example, the vehicle control system 103 may determine, based on the navigation information, that a bridge on a current path to the destination is out-of-service, and in response, identify an alternate route. The cloud service 112 also includes machine learning models that may be provided to the vehicle control system 103 periodically as an update to machine learning models currently stored on the vehicle control system 103. Further, the cloud service 112 may apply annotation data transmitted by the vehicle control system 103 to the machine learning models for reinforcement or update.

Further still, in an embodiment, the vehicle control system 103 may communicate with other vehicles within proximity of the vehicle 101, e.g., over a vehicular communications systems network. Such communications may include, for example, vehicle-to-vehicle (V2V) messages over a given frequency. The communications between vehicles may include safety warnings, traffic information, and lane change indications to prevent accidents and traffic congestion. Further communications may include annotation data for objects detected and classified by the sensors 116 and provided via the gamified UI.

The vehicle control system 103 and cloud service 122 are illustratively in communication via a network 120, which may be embodied as any type of wired or wireless communication network, or hybrids or combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 2:
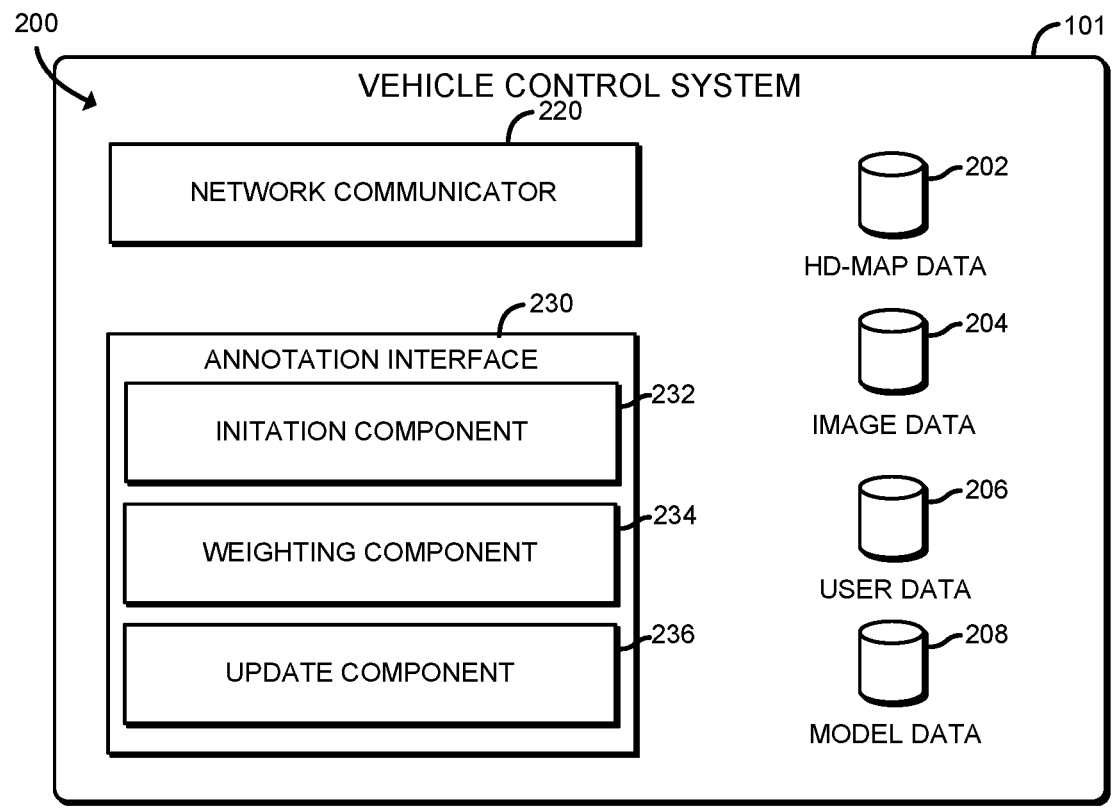
FIG. 2 is a simplified block diagram of at least one embodiment of an environment that may be established by the vehicle control system of FIG. 1.

Referring now to FIG. 2, the vehicle control system 103 may establish an environment 200 in operation. The illustrative environment 200 includes a network communicator 220 and an annotation interface 230. Each of the components of the environment 200 may be embodied as hardware, firmware, software, or a combination thereof. Further, in some embodiments, one or more of the components of the environment 200 may be embodied as circuitry or a collection of electrical devices (e.g., network communicator circuitry 220, annotation interface circuitry 230, etc.). It should be appreciated that, in such embodiments, one or more of the network communicator circuitry 220 and annotation interface circuitry 230 may form a portion of one or more of the NIC 112, compute engine 102, the communication circuitry 110, the I/O subsystem 108, data storage devices 114, power supply 416, and/or other components of the vehicle control system 103.

In the illustrative embodiment, the environment 200 includes HD map data 202, image data 204, user data 206, and model data 208. The HD-map data 202 may be embodied as any data relating a HD-map maintained by the vehicle control system 103. The HD-map provides a highly precise map to support navigation of the vehicle. The HD map data 202 may be built or reinforced by machine learning techniques from trained image data and observed image data (e.g., while the vehicle 101 is in operation on the road). The image data 204 may be embodied as any image data captured by camera sensors (e.g., of the sensors 116). Machine learning modules may evaluate the image data 204 to detect objects (e.g., obstacles) and classify the objects. The annotation interface 230 may in turn provide annotations (e.g., received as user input) for the classified objects, in which the annotations are in turn used to update the HD-map data 202 and model data 208. The user data 206 may be embodied as any data relating to a user profile. A user may be any individual associated with the vehicle 103, such as a driver, a passenger, an owner, and the like. Individual user data 206 includes one or more scores associated with the user, each of the scores relating to the gamified UI provided for annotation of image data 204. The annotation interface 330 may build the scores based on metrics such as a direct trust, reputation, and confidence associated with the user. Direct trust may refer to a metric based on experiences that the gamified UI has made directly with the user. Values associated with direct trust may be determined, e.g., by using a mean or weight mean of historical user input or experiences. Reputation may refer to a metric based on experiences of other users relative to a given user. Such experiences may include whether the other users are inside the vehicle 101 is in operation, whether a vehicle 101 associated with another user is within a specified proximity of the vehicle 101 associated with the given user while the vehicle 101 is in operation, and the like. Reputation metrics may be determined if the vehicle control system 103 does not have enough direct trust or confidence metric data. Confidence may refer to a metric based on a reliability of the direct trust metric value associated with the user. The higher the confidence metric, the vehicle control system 103 may determine with greater certainty that the direct trust value matches a behavior of the user. The user data 206 may also include scoring and ranking data associated with the gamified UI as it pertains to the user. Model data 208 may be embodied as any data indicative of machine learning models generated by the vehicle control system 103 or received from the cloud service 122. Model data 208 may be built and reinforced using image data 204 and subsequently obtained data such as annotations from the gamified UI.

The network communicator 220, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from other devices, such as from a vehicle control system 103 in a given vehicle 101. To do so, the network communicator 220 is configured to receive and process data packets from one system or computing device and to prepare and send data packets to another computing device or system. Accordingly, in some embodiments, at least a portion of the functionality of the network communicator 220 may be performed by the communication circuitry 110, and, in the illustrative embodiment, by the NIC 112.

The illustrative annotation interface 230, which may be embodied as hardware, firmware, software, virtualized hardware, emulated architecture, and/or a combination thereof as discussed above, is configured to detect a trigger to initiate an annotation prompt associated with a classified object from image data 204, present via the gamified UI the annotation prompt, receive via the gamified UI user input indicative of a response to the annotation prompt by a user, and update a confidence score associated with the classified object as a function of one or more user data 206 metrics. To do so, the annotation interface 230 includes an initiation component 232, weighting component 234, and update component 236.

The initiation component 232 is configured to detect a trigger in which to prompt a user for annotation. An example of a trigger includes instances in which an image classifier generates a confidence score for a classified object that falls below a given threshold. By receiving user input, the image classifier may confirm whether the object corresponds to the classification. Another example of a trigger includes instances in which anomalous behavior in one or more sensors in a vehicle control system is detected. Anomalous behavior may include sensor conflicts (e.g., a given camera sensor detects an object classified as an item A whereas another camera sensor detects the same object but classifies the object as item B) and other types of sensor malfunctions. Yet another example of a trigger includes a user-initiated request to initiate an annotation prompt. For example, the user may access the request for an annotation prompt via an on-board UI of the vehicle control system 103. Once a trigger is detected, the initiation component 232 may generate an annotation prompt. The prompt may be based on the trigger. For instance, if the trigger relates to a confidence score of the classified object or to a sensor conflict, the prompt may request that the user identify, from a list of potential labels (including the label that the classifier (or classifiers) determined), the correct label. If the trigger relates to a user-initiated request, the prompt may request for any type of object observed or verified by the vehicle control system 103 sensors. Further, the interface may maintain a queue of objects to be annotated by the user. During a user-initiated request, the interface may prompt the user to identify such objects for annotation.

The weighting component 234 is configured to weight user responses to an annotation prompt. The weighting component 234 may evaluate the response against user data 206, such as direct trust, reputation, and confidence metric values historically determined for the user. The weighting component 234 may adjust, based on the evaluation, a confidence score associated with the classified object given the user input. For example, if a user with a relatively high metric value for direct trust and confidence responds to a prompt with an answer that matches a label previously identified by the classifier, the weighting component 234 may increase the confidence score associated with that object label. If the same user provides a response that does not match, the weighting component 234 may decrease the confidence score associated with that object label (and increase a confidence score associated with the object label matching the response). As another example, if a user with relatively low metric values for direct trust and confidence responds to a prompt with an answer that does not match a label previously identified for an object, the weighting component 234 may make a minimal (or no) adjustment to the confidence score. The weighting methods used may be previously defined.

The update component 236 is configured to update the HD-map data 202, user data 206, and model data 208 based on responses provided by the user. For instance, if the confidence score associated with a given object exceeds a given threshold, the update component 236 may translate the user response to annotation data usable for the artificial intelligence (AI) layer associated with the HD-map data 202. The update component 236 may also transmit the annotation data to machine learning modules executing in the vehicle control system 103 and to the cloud service 122 to reinforce preexisting models. Further, the update component 236 may also increase (or decrease) user metric values associated with the user data 206 based on the response.

Figure 3:
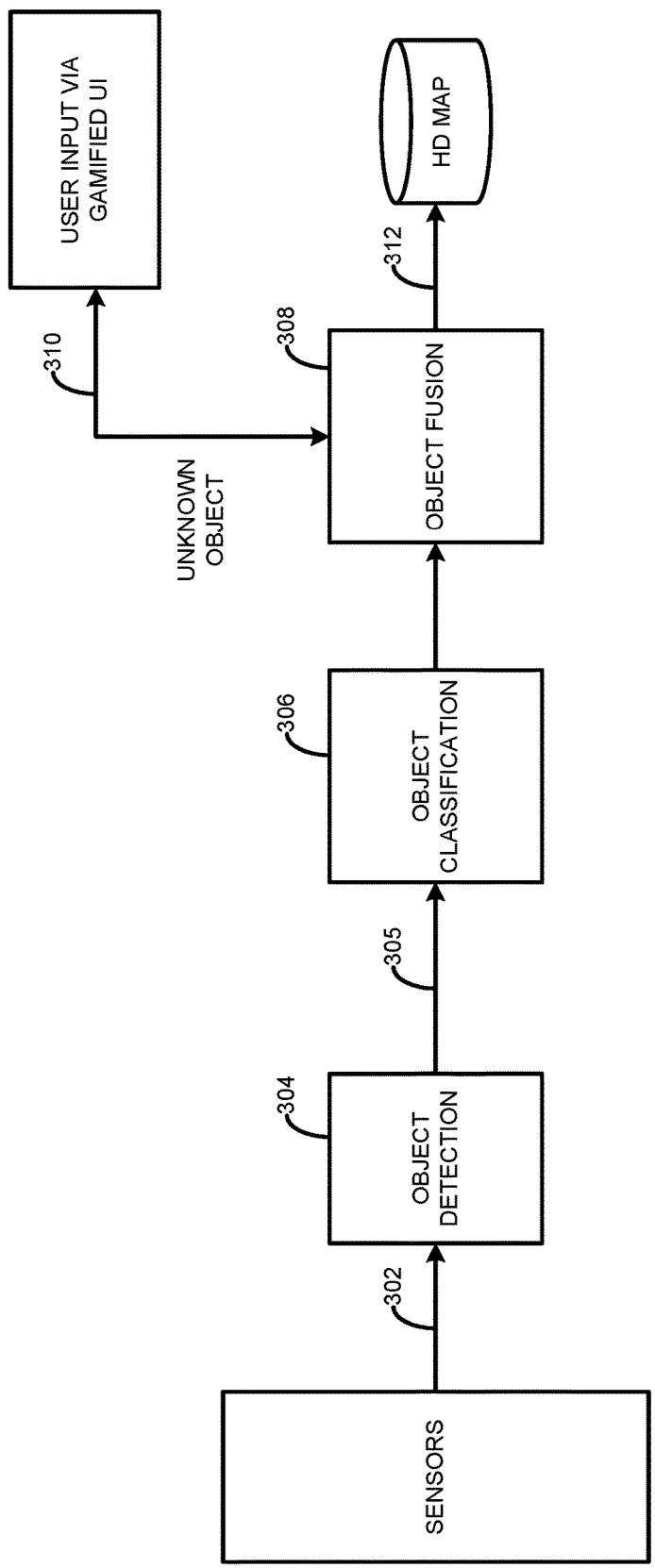
FIG. 3 is a simplified diagram of at least one embodiment of a flow from sensor perception in the vehicle control system of FIG. 1 to presentation of the gamified user interface.

Referring now to FIG. 3, an example flow 300 depicts sensor perception by the vehicle control system 103 to an initiation of the gamified UI prompt to a user. In 302, the sensors 116 send data to an object detection component in the vehicle control system 103 machine learning modules. In 304, object detection is performed on the sensor data. Object detection may include, e.g., LIDAR-based, CV-based, and RADAR-based obstacle detection. In 305, the detected object data is sent to object classifier components in the machine learning modules. In 306, object classification is performed on the detected objects. For each detected object, a confidence score is generated. In 308, the classified objects are sent to object fusion components in the machine learning modules. Classified objects that fall below a threshold are marked as an unknown object and trigger the gamified UI (in 310). User input is provided via the gamified UI and responses are returned for object fusion. In 312, the HD-map is updated.

Figure 4:
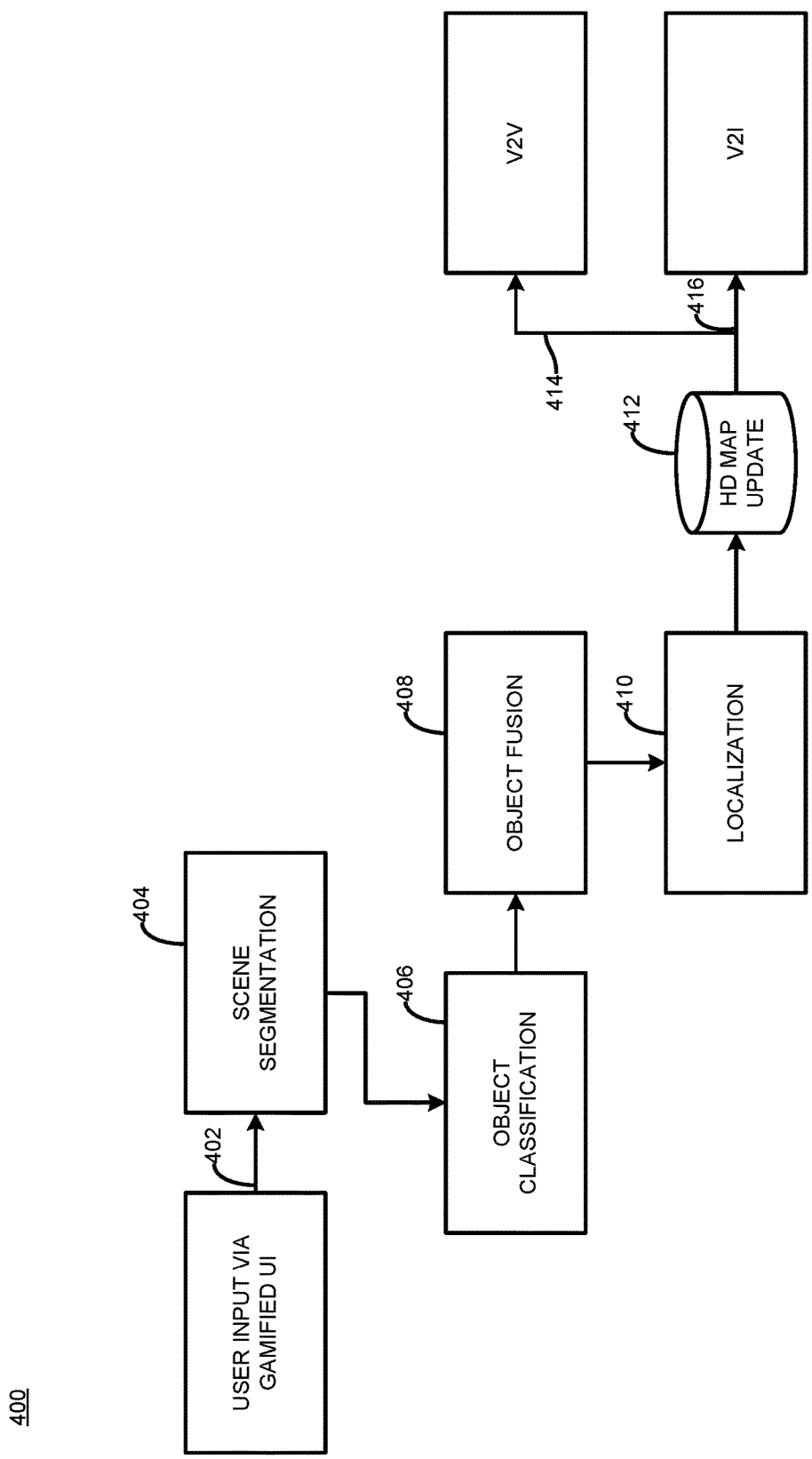
FIG. 4 is a simplified diagram of at least one embodiment of a flow from user input to the gamified user interface to an update of a HD-map of the vehicle control system of FIG. 1.

Referring now to FIG. 4, an example flow 400 depicts user input via the gamified UI to a propagation of HD-map updates. In 402, user input provided to the gamified UI is input to a scene segmentation process. In 404, scene segmentation occurs and is sent to object classification, in which object classification is updated based on the user input. In 408, the classified object is sent to object fusion in which the user input and classified object are used to update machine learning models. In 410, the user input is sent to a localization process, in which the user input is translated to an annotation readable by the HD-map. In 412, the HD-map is updated with the translated annotation. The updates may be propagated to different services over a network. In 414, the HD-map update is sent to other vehicles via a vehicle-to-vehicle (V2V) update. IN 416, the HD-map update is propagated to a vehicle-to-infotainment (V2I) service.

Figure 5:
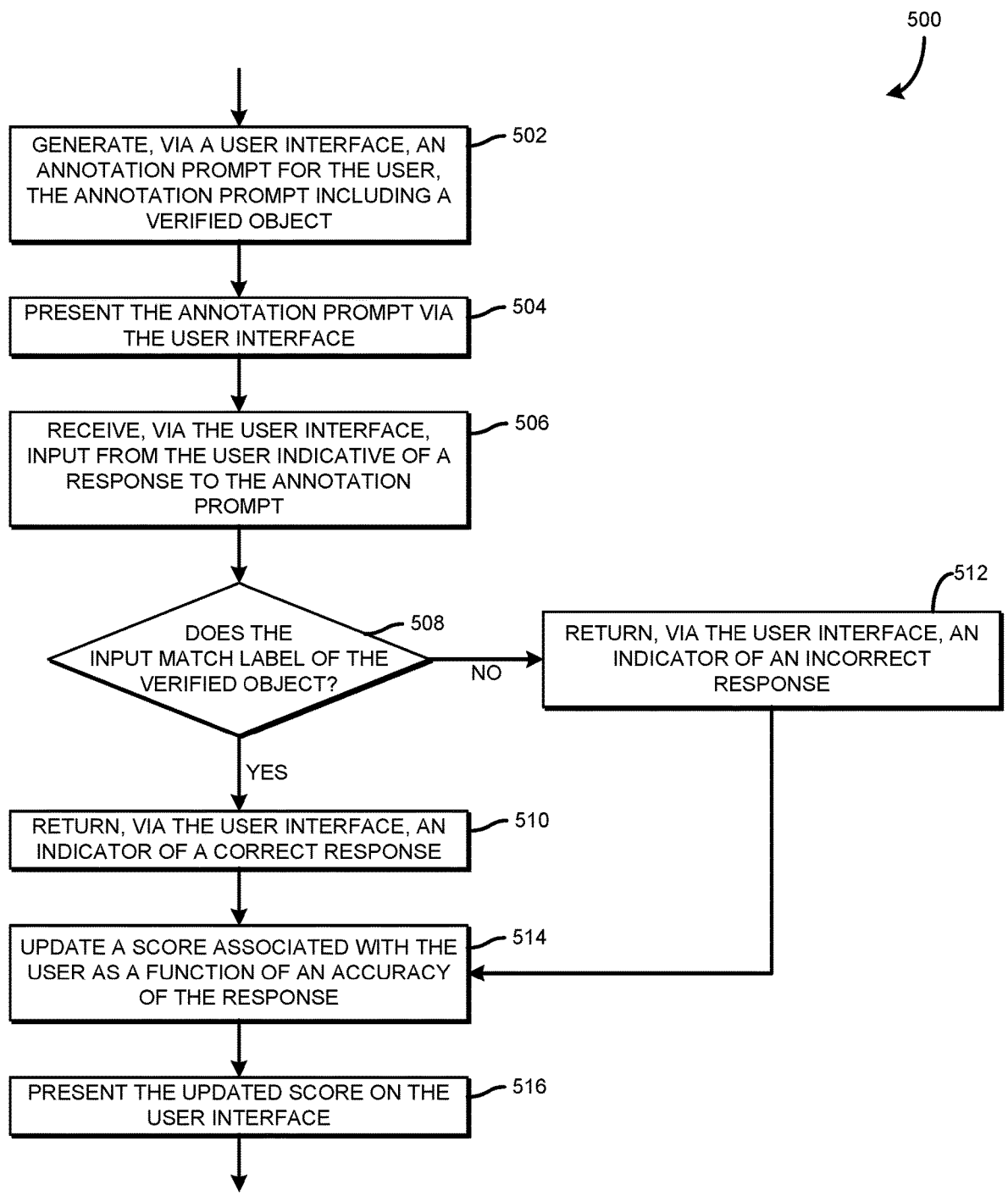
FIG. 5 is a simplified flow diagram of at least one embodiment of a method for measuring a user score used to determine a confidence of user input to the gamified user interface.

Referring now to FIG. 5, the vehicle control system 103, in operation, may perform a method 500 for measuring user metrics used to determine a confidence measure in user input to the gamified UI. As shown, the method 500 begins in block 502, in which the vehicle control system 103 generates, via the gamified UI, an annotation prompt for the user. The annotation prompt includes a verified object. In block 504, the vehicle control system 103 presents the annotation prompt via the UI. In block 506, vehicle control system 103 receives, via the UI, input from the user indicative of a response to the annotation prompt. The accuracy of the response may be used to increase (or decrease) a score associated with the user. That is, high score associated with the user may indicate to the vehicle control system 103 that answers provided by the user are likely reliable.

In block 508, the vehicle control system 103 determines whether the response matches a label associated with the verified object. If so, then in block 510, the vehicle control system 103 returns, via the UI, an indicator to the user that the response was correct. Otherwise, in block 512, the vehicle control system 103 returns, via the UI, an indication of an incorrect response. In either case, the method proceeds to block 514, in which the vehicle control system 103 updates the user score as a function of an accuracy of the response. In some cases, if the user provided an incorrect response, the vehicle control system 103 may weight the amount at which the score is decreased based on a similarity measure of the incorrect response to the label of the verified object. In block 516, the vehicle control system 103 presents the updated score on the user interface.

Figure 6:
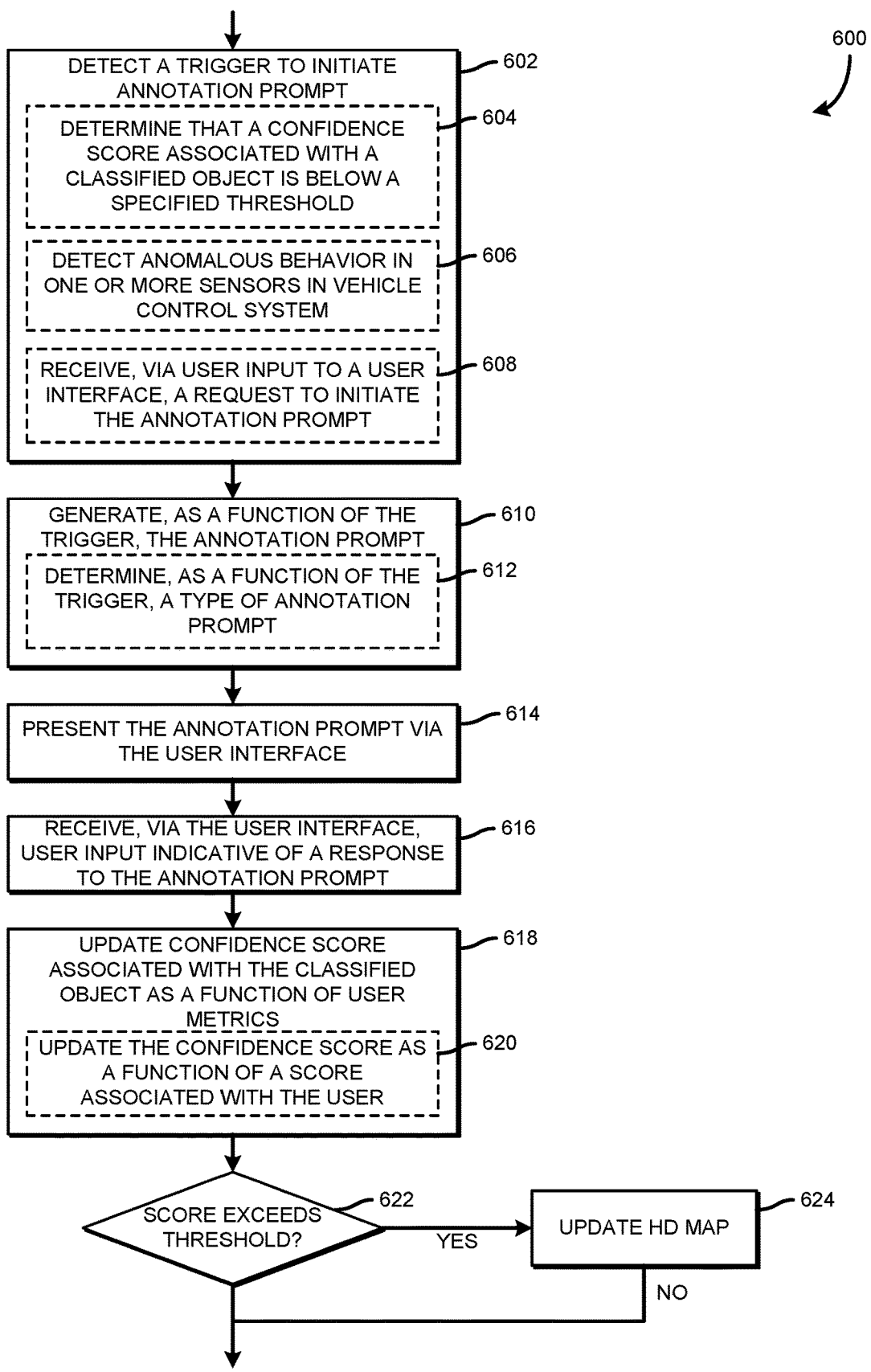
FIG. 6 is a simplified flow diagram of at least one embodiment of a method for collecting annotated data via the gamified user interface.

Referring now to FIG. 6, the vehicle control system 103, in operation, may perform a method 600 for collecting annotated data via the gamified UI. As shown, the method 600 begins in block 602, in which the vehicle control system 103 detects a trigger to initiate an annotation prompt. For example, in block 604, the vehicle control system 103 may determine that a confidence score associated with a classified object is below a specified threshold. In other cases, the trigger may occur if the classified object is within a threshold range. As another example, in block 606, the vehicle control system 103 may detect anomalous behavior in one or more of the sensors 116 (e.g., due to a sensor conflict). As yet another example, in block 608, the vehicle control system 103 receives, via user input to the UI, a request to initiate an annotation prompt.

In block 610, the vehicle control system 103 generates, as a function of the trigger, the annotation prompt. For instance, to do so, in block 612, the vehicle control system 103 determines, as a function of the trigger, a type of annotation prompt. An example type may include a "guess the object game," in which the UI marks a given object and prompts the user to select from a list the correct label. Another example includes a "find the object game," in which the UI provides a list of labels and prompts the user to indicate (e.g., using touch screen features of the display and UI) an area of the display that shows the object corresponding to a given label. Yet another example includes a "spot the difference game," in which two displays of the same image are presented on the UI, and the user is prompted to identify a missing object in one of the displays. In block 616, the vehicle control system 103 presents the annotation prompt via the UI.

In block 618, the vehicle control system 103 updates a confidence score associated with the classified object as a function of metrics associated with the user. Particularly, in block 620, the vehicle control system 103 updates a confidence score as a function of a score associated with the user. In block 622, the vehicle control system 103 determines whether the confidence score associated with the object exceeds a threshold. If so, then in block 624, the vehicle control system 103 updates the HD-map. Further, the vehicle control system 103 may propagate the update to other systems (e.g., other vehicles, the cloud service 122, etc.). If not, no update is performed on the HD-map.

Figure 7A:
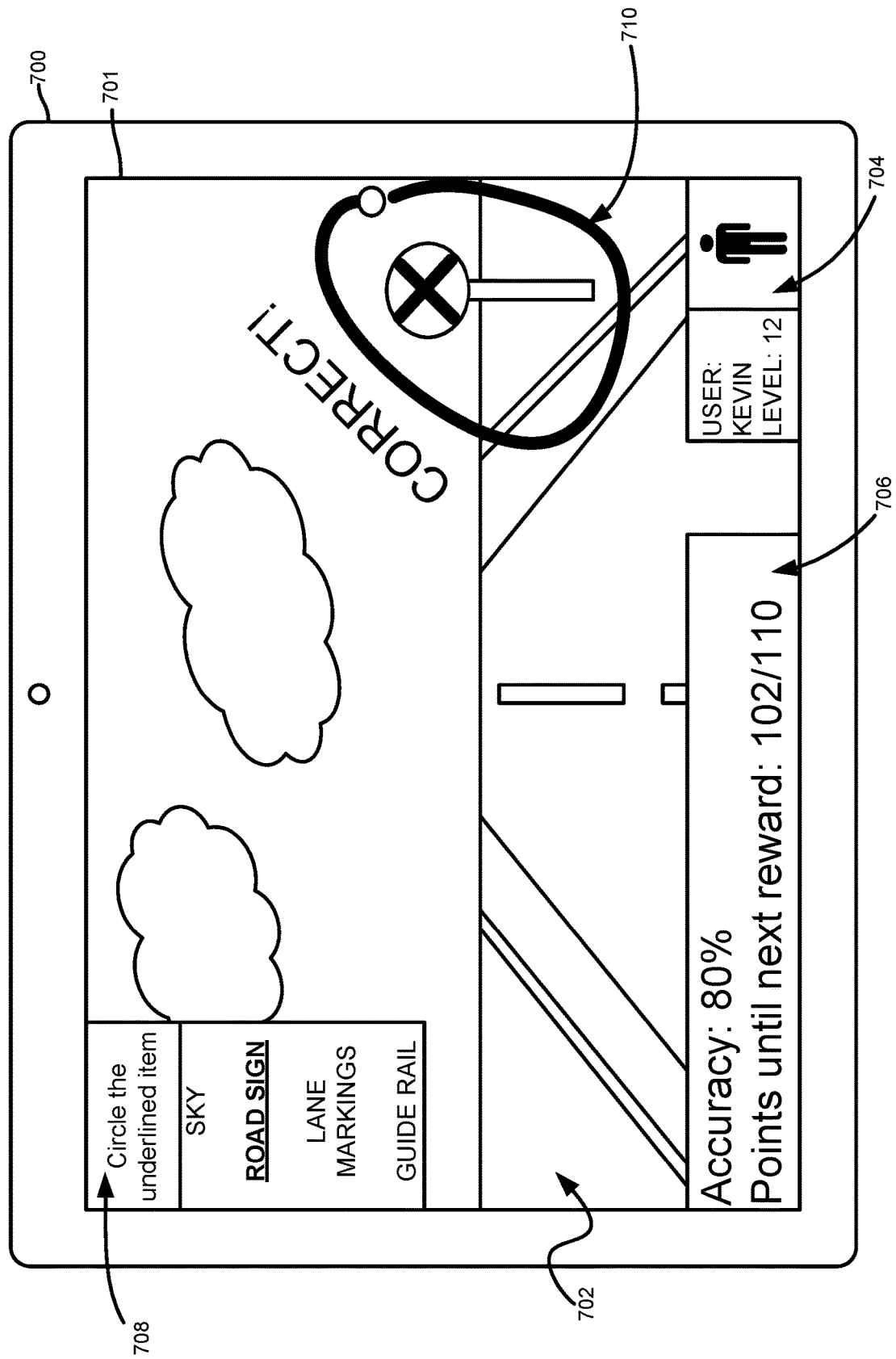
FIGS. 7A and 7B are simplified conceptual diagrams of example gamified user interfaces presented via the vehicle control system of FIG. 1.
Figure 7B:
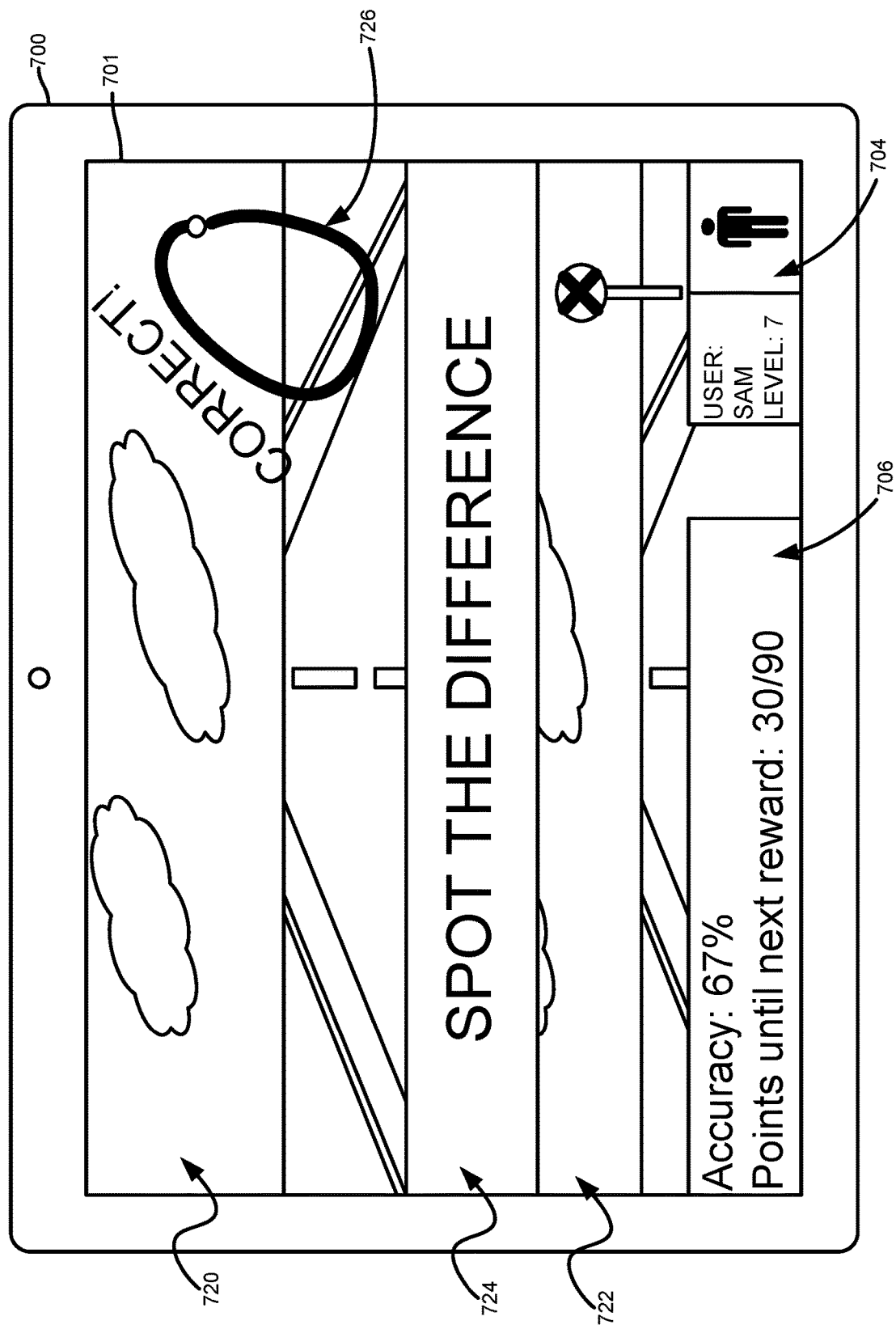

Referring now to FIGS. 7A and 7B, examples of a gamified UI are shown. Particularly, a display 700 presents the gamified UI 701. Illustratively, user profile data 704 is presented on the bottom right-hand portion of the UI 701. The user data 704 may include a profile image of the user, a username, and a user level associated with the user. The user level may be calculated as a function of user scores and an amount of responses provided by the user. User statistics data 706 is provided in the bottom left-hand portion of the UI 701. The user statistics data 706 may display to the user an accuracy measure of responses provided by the user. The user statistics data 706 may also provide gaming data such as an indicator of game points. The game points may be used to determine an award (e.g., the award could refer to "levelling up" a user, or the award could correspond to in-game items, or the award could correspond to goods or services that a user may receive).

FIG. 7A depicts an image 702 of a road including various scenery, including the road, lane markings, sky, guard rails, and a road sign. Illustratively, the UI 701 includes a prompt 708 requesting that the user circle the underlined item within the image 702, here, "road sign." Marking 710 indicates a user response (e.g., which can be generated using touch-screen features of the display 700). As shown, the marking 710 corresponds to a circling of the road sign. Once received, the vehicle control system 103 may update an HD-map based on the correct response. The vehicle control system 103 may also update user data based on the correct response.

FIG. 7B depicts images 720 and 722, each of a road including various scenery, including the road, lane markings, sky, and guard rails. Of note, image 722 also includes a road sign, which is missing in image 720. Illustratively, the UI 701 includes a prompt 724 requesting that the user spot the difference between the images 720 and 722. Marking 726 indicates a user response (e.g., which can be generated using touch-screen features of the display 700). As shown, the marking 726 corresponds to a circling of a lack of road sign in the image 720. Once received, the vehicle control system 103 may update an HD-map based on the correct response. The vehicle control system 103 may also update user data based on the correct response.

EXAMPLES

Illustrative examples of the technologies disclosed herein are provided below. An embodiment of the technologies may include any one or more, and any combination of, the examples described below.

Example 1 includes an apparatus, comprising a circuitry to detect a trigger to initiate an annotation prompt associated with an object classified from an image; present, via a user interface, the annotation prompt; receive, via the user interface, user input indicative of a response to the annotation prompt by a user; and update a confidence score associated with the classified object as a function of one or more metrics associated with the user.

Example 2 includes the subject matter of Example 1, and wherein the circuitry is further to generate, as a function of the trigger, the annotation prompt.

Example 3 includes the subject matter of any of Examples 1 and 2, and wherein to generate, as the function of the trigger, the annotation prompt comprises to determine, as the function of the trigger, a type of the annotation prompt.

Example 4 includes the subject matter of any of Examples 1-3, and wherein to detect the trigger to initiate the annotation prompt comprises to determine that the confidence score associated with the classified object is below a specified threshold.

Example 5 includes the subject matter of any of Examples 1-4, and wherein to detect the trigger to initiate the annotation prompt comprises to detect anomalous behavior in one or more sensors of the apparatus.

Example 6 includes the subject matter of any of Examples 1-5, and wherein to detect the trigger to initiate the annotation prompt comprises to receive, via the user interface, user input indicative of a request to initiate the annotation prompt.

Example 7 includes the subject matter of any of Examples 1-6, and wherein the circuitry is further to generate, via the user interface, a second annotation prompt, the second annotation prompt including a verified object; receive, via the user interface, user input indicative of a response to the second annotation prompt; and update a user score, the user score associated with the user as a function of an accuracy of the response to the second annotation prompt relative to the verified object.

Example 8 includes the subject matter of any of Examples 1-7, and wherein to update the confidence score associated with the classified object as the function of one or more metrics associated with the user comprises to update the confidence score as a function of the updated user score.

Example 9 includes the subject matter of any of Examples 1-8, and wherein the circuitry is further to determine whether the response matches a label associated with the verified object.

Example 10 includes the subject matter of any of Examples 1-9, and wherein the circuitry is further to, upon a determination that the confidence score exceeds a specified threshold, update a high definition-map with the classified object.

Example 11 includes one or more machine-readable storage media having a plurality of instructions, which, when executed, causes a vehicle control system to detect a trigger to initiate an annotation prompt associated with an object classified from an image; present, via a user interface, the annotation prompt; receive, via the user interface, user input indicative of a response to the annotation prompt by a user; and update a confidence score associated with the classified object as a function of one or more metrics associated with the user.

Example 12 includes the subject matter of Example 11, and wherein the plurality of instructions further causes the vehicle control system to generate, as a function of the trigger, the annotation prompt.

Example 13 includes the subject matter of any of Examples 11 and 12, and wherein to generate, as the function of the trigger, the annotation prompt comprises to determine, as the function of the trigger, a type of the annotation prompt.

Example 14 includes the subject matter of any of Examples 11-13, and wherein to detect the trigger to initiate the annotation prompt comprises to determine that the confidence score associated with the classified object is below a specified threshold.

Example 15 includes the subject matter of any of Examples 11-14, and wherein to detect the trigger to initiate the annotation prompt comprises to detect anomalous behavior in one or more sensors of the vehicle control system.

Example 16 includes the subject matter of any of Examples 11-15, and wherein to detect the trigger to initiate the annotation prompt comprises to receive, via the user interface, user input indicative of a request to initiate the annotation prompt.

Example 17 includes the subject matter of any of Examples 11-16, and wherein the plurality of instructions further causes the vehicle control system to generate, via the user interface, a second annotation prompt, the second annotation prompt including a verified object; receive, via the user interface, user input indicative of a response to the second annotation prompt; and update a user score, the user score associated with the user as a function of an accuracy of the response to the second annotation prompt relative to the verified object.

Example 18 includes the subject matter of any of Examples 11-17, and wherein to update the confidence score associated with the classified object as the function of one or more metrics associated with the user comprises to update the confidence score as a function of the updated user score.

Example 19 includes the subject matter of any of Examples 11-18, and wherein the plurality of instructions further causes the vehicle control system to determine whether the response matches a label associated with the verified object.

Example 20 includes the subject matter of any of Examples 11-19, and wherein the plurality of instructions further causes the vehicle control system to, upon a determination that the confidence score exceeds a specified threshold, update a high definition-map with the classified object.

Example 21 includes a computer-implemented method comprising detecting, by a vehicle control system, a trigger to initiate an annotation prompt associated with an object classified from an image; presenting, by the vehicle control system and via a user interface, the annotation prompt; receiving, by the vehicle control system and via the user interface, user input indicative of a response to the annotation prompt by a user; and updating, by the vehicle control system, a confidence score associated with the classified object as a function of one or more metrics associated with the user.

Example 22 includes the subject matter of Example 21, and further including generating, by the vehicle control system and as a function of the trigger, the annotation prompt.

Example 23 includes the subject matter of any of Examples 21 and 22, and wherein generating the annotation prompt comprises determining, by the vehicle control system and as the function of the trigger, a type of the annotation prompt.

Example 24 includes the subject matter of any of Examples 21-23, and wherein detecting the trigger to initiate the annotation prompt comprises determining, by the vehicle control system, that the confidence score associated with the classified object is below a specified threshold.

Example 25 includes a vehicle control system comprising means for detecting a trigger to initiate an annotation prompt associated with an object classified from an image; circuitry for presenting, via a user interface, the annotation prompt; circuitry for receiving, via the user interface, user input indicative of a response to the annotation prompt by a user; and means for updating a confidence score associated with the classified object as a function of one or more metrics associated with the user.

The invention claimed is:

1. An apparatus, comprising:
 a circuitry to:
  detect a trigger to initiate an annotation prompt associated with an object classified from an image;
  present, via a user interface, the annotation prompt;
  receive, via the user interface, user input indicative of a response to the annotation prompt by a user;
  update a confidence score associated with the classified object as a function of one or more metrics associated with the user;
  generate, via the user interface, a second annotation prompt, the second annotation prompt including a verified object;
  receive, via the user interface, user input indicative of a response to the second annotation prompt; and
  update a user score, the user score associated with the user as a function of an accuracy of the response to the second annotation prompt relative to the verified object.

2. The apparatus of claim 1, wherein the circuitry is further to generate, as a function of the trigger, the annotation prompt.

3. The apparatus of claim 2, wherein to generate, as the function of the trigger, the annotation prompt comprises to determine, as the function of the trigger, a type of the annotation prompt.

4. The apparatus of claim 1, wherein to detect the trigger to initiate the annotation prompt comprises to determine that the confidence score associated with the classified object is below a specified threshold.

5. The apparatus of claim 1, wherein to detect the trigger to initiate the annotation prompt comprises to detect anomalous behavior in one or more sensors of the apparatus.

6. The apparatus of claim 1, wherein to detect the trigger to initiate the annotation prompt comprises to receive, via the user interface, user input indicative of a request to initiate the annotation prompt.

7. The apparatus of claim 1, wherein to update the confidence score associated with the classified object as the function of one or more metrics associated with the user comprises to update the confidence score as a function of the updated user score.

8. The apparatus of claim 1, wherein the circuitry is further to determine whether the response matches a label associated with the verified object.

9. The apparatus of claim 1, wherein the circuitry is further to, upon a determination that the confidence score exceeds a specified threshold, update a high definition-map with the classified object.

10. One or more non-transitory, machine-readable storage media having a plurality of instructions, which, when executed, causes a vehicle control system to:
 detect a trigger to initiate an annotation prompt associated with an object classified from an image;
 present, via a user interface, the annotation prompt;
 receive, via the user interface, user input indicative of a response to the annotation prompt by a user;
 update a confidence score associated with the classified object as a function of one or more metrics associated with the user;
 generate, via the user interface, a second annotation prompt, the second annotation prompt including a verified object;
 receive, via the user interface, user input indicative of a response to the second annotation prompt; and
 update a user score, the user score associated with the user as a function of an accuracy of the response to the second annotation prompt relative to the verified object.

11. The one or more non-transitory, machine-readable storage media of claim 10, wherein the plurality of instructions further causes the vehicle control system to generate, as a function of the trigger, the annotation prompt.

12. The one or more non-transitory, machine-readable storage media of claim 11, wherein to generate, as the function of the trigger, the annotation prompt comprises to determine, as the function of the trigger, a type of the annotation prompt.

13. The one or more non-transitory, machine-readable storage media of claim 10, wherein to detect the trigger to initiate the annotation prompt comprises to determine that the confidence score associated with the classified object is below a specified threshold.

14. The one or more non-transitory, machine-readable storage media of claim 10, wherein to detect the trigger to initiate the annotation prompt comprises to detect anomalous behavior in one or more sensors of the vehicle control system.

15. The one or more non-transitory, machine-readable storage media of claim 10, wherein to detect the trigger to initiate the annotation prompt comprises to receive, via the user interface, user input indicative of a request to initiate the annotation prompt.

16. The one or more non-transitory, machine-readable storage media of claim 10, wherein to update the confidence score associated with the classified object as the function of one or more metrics associated with the user comprises to update the confidence score as a function of the updated user score.

17. The one or more non-transitory, machine-readable storage media of claim 10, wherein the plurality of instructions further causes the vehicle control system to determine whether the response matches a label associated with the verified object.

18. The one or more non-transitory, machine-readable storage media of claim 10, wherein the plurality of instructions further causes the vehicle control system to, upon a determination that the confidence score exceeds a specified threshold, update a high definition-map with the classified object.

19. A computer-implemented method comprising:
    detecting, by a vehicle control system, a trigger to initiate an annotation prompt associated with an object classified from an image;
    presenting, by the vehicle control system and via a user interface, the annotation prompt;
    receiving, by the vehicle control system and via the user interface, user input indicative of a response to the annotation prompt by a user;
    updating, by the vehicle control system, a confidence score associated with the classified object as a function of one or more metrics associated with the user;
    generating, by the vehicle control system and via the user interface, a second annotation prompt, the second annotation prompt including a verified object;
    receiving, by the vehicle control system and via the user interface, user input indicative of a response to the second annotation prompt; and
    updating, by the vehicle control system, a user score, the user score associated with the user as a function of an accuracy of the response to the second annotation prompt relative to the verified object.

20. The computer-implemented method of claim 19, further comprising generating, by the vehicle control system and as a function of the trigger, the annotation prompt.

21. The computer-implemented method of claim 20, wherein generating the annotation prompt comprises determining, by the vehicle control system and as the function of the trigger, a type of the annotation prompt.

22. The computer-implemented method of claim 19, wherein detecting the trigger to initiate the annotation prompt comprises determining, by the vehicle control system, that the confidence score associated with the classified object is below a specified threshold.

23. A vehicle control system comprising:
    means for detecting a trigger to initiate an annotation prompt associated with an object classified from an image;
    circuitry for presenting, via a user interface, the annotation prompt;
    circuitry for receiving, via the user interface, user input indicative of a response to the annotation prompt by a user;
    means for updating a confidence score associated with the classified object as a function of one or more metrics associated with the user;
    circuitry for generating a second annotation prompt, the second annotation prompt including a verified object;
    circuitry for receiving user input indicative of a response to the second annotation prompt; and
    means for updating a user score, the user score associated with the user as a function of an accuracy of the response to the second annotation prompt relative to the verified object.

* * * * *